United States Patent [19]

Mandelik

[11] 4,060,588

[45] Nov. 29, 1977

[54] PROCESS FOR REMOVING SULFUR-CONTAINING GASES FROM WASTE GASES

[75] Inventor: Bernard G. Mandelik, Houston, Tex.

[73] Assignee: Pullman Incorporated, Chicago, Ill.

[21] Appl. No.: 643,267

[22] Filed: Dec. 22, 1975

[51] Int. Cl.$^2$ .................... B01J 8/00; C01B 17/00; C01F 5/24; C01B 17/02

[52] U.S. Cl. .................... 423/242; 423/431; 423/561 A; 423/561 R; 423/573 R

[58] Field of Search .................... 423/242–244, 423/561 A, 561 R, 431, 573

[56] References Cited

U.S. PATENT DOCUMENTS

| | | | |
|---|---|---|---|
| 3,574,530 | 4/1971 | Suriani et al. | 423/244 |
| 3,599,610 | 8/1971 | Spector | 423/168 X |
| 3,625,164 | 12/1971 | Spector | 423/168 X |
| 3,784,680 | 1/1974 | Strong et al. | 423/571 |

Primary Examiner—O. R. Vertiz
Assistant Examiner—Gregory A. Heller

[57] ABSTRACT

Sulfur-containing compounds, particularly sulfur dioxide, are removed from stack gas streams by wet scrubbing the gases wherein an alkaline earth metal sulfate and/or sulfite are formed. Example processes are lime/limestone and Double Alkali scrubbing processes. These processes produce sludge material containing primarily the alkaline earth metal sulfate which is disposed of only with significant difficulty. An improvement is described herein whereby the aqueous sludge is reduced in contact with sufficient coal to produce the corresponding sulfide and effluent gases from the reduction step having a sufficient heating value to be used to dry the mixture of sludge and coal prior to the reducing step. The alkaline earth metal carbonate and elemental sulfur are recovered from the sulfide.

14 Claims, 1 Drawing Figure

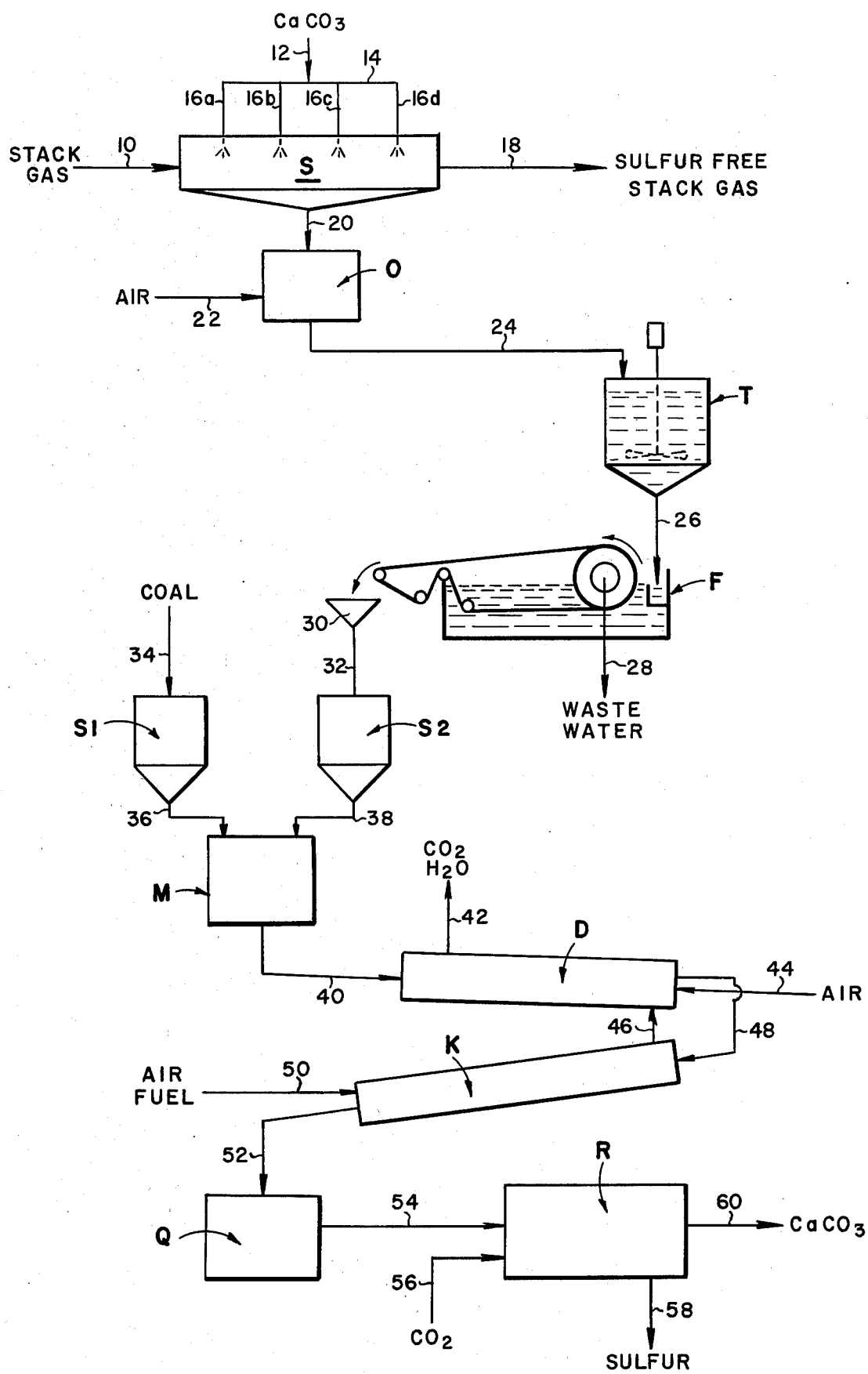

//4,060,588

PROCESS FOR REMOVING SULFUR-CONTAINING GASES FROM WASTE GASES

BACKGROUND OF THE INVENTION

Oxides of sulfur, such as sulfur dioxide and sulfur trioxide are components of many gaseous effluents such as chemical processes and stack gases from the boilers of coal fired electric power plants. These oxides of sulfur are noxious to human, animal and plant life and are unacceptable for discharge into the atmosphere. Many attempts have been made to successfully remove these gases from stack effluents to protect the atmosphere and to recover the sulfur value as elemental sulfur and recycle the alkali metal carbonate to the gas scrubbing system. The companion necessity to conserve energy has compounded the problem of pollution control, particularly with respect to the recovery of sulfur from stack gases.

Some processes for cleaning these effluent gases and recovering the sulfur values are described in U.S. Pat. Nos. 3,574,530 and 3,883,639, for example. The process described in U.S. Pat. No. 3,574,530 involves the reduction of calcium sulfate sludge with carbon and recovery of sulfur, but fails to provide for the economic utilization of the energy involved and minimization of the cost for such recovery. U.S. Pat. No. 3,883,639 discloses the advantages of using a soluble sulfate, especially magnesium, in the calcium carbonate scrubbing solution, but does not address itself to the recovery of sulfur values.

While these prior art processes are favorable, the economic and ecological advantages of this invention are not described.

Accordingly, a method for removing sulfur dioxide from waste gases and providing for efficient recovery of the sulfur and alkaline earth metal values of the system, while efficiently utilizing the energy necessary for such recovery, would be a significant advance in the art.

Therefore, it is an object of this invention to reduce the sludges containing alkaline earth metal sulfates and/or sulfites produced in wet scrubbing systems to the corresponding sulfide and, at the same time, utilize the heating values of the effluent gases from such reduction reaction to improve the overall economy of the gas cleaning process.

It is an object of this invention to produce a gas in the reduction reaction having sufficient heating value to dry the sulfate/sulfite mixture prior to reduction of same to recover the corresponding alkaline earth metal sulfide.

Other objects and advantages of the described invention will be apparent to those of ordinary skill in the art from the description hereof.

SUMMARY OF THE INVENTION

In accordance with the teaching of this invention to achieve the aforementioned objects, a process is provided for the removal of the oxides of sulfur from stack gases by scrubbing the stack gas with an aqueous medium and reacting the dissolved sulfur oxides with an alkaline earth metal compound such as calcium carbonate in either the scrubber circulating loop as in conventional lime/limestone processes or in a separate reaction loop as in the well known Double Alkali process to form a sulfate/sulfite slurry containing, primarily, the corresponding alkaline earth metal sulfate. The solids content of the aqueous slurry is increased and the resulting slurry intimately mixed with a carbonaceous reductant in proportions such that there is an excess of the reductant necessary to reduce the sulfate and/or sulfite present in the slurry and maintain a reducing atmosphere in the reducing zone. Suitable carbonaceous reductants include, for example, coal, coke, chars, asphalts, heavy oils and the like. The mixture, preferably pelletized or extruded, is dried in a drying zone to remove substantially all the water present and then passed to a reducing zone where the reductant reacts with the sulfate and/or sulfite in the slurry to form a combustible gas having sufficient heating value to be used as a fuel in the drying zone. The gases produced in this reducing zone, principally carbon monoxide and hydrogen, are burned in the drying zone to provide a substantial part, if not all, of the heat for the removal of water, including water of hydration from the mixture of the alkaline earth metal sulfate/sulfite slurry and the reductant.

The flue gases exiting the drying zone can be further used, as described in U.S. Pat. No. 3,574,530, for example, to produce alkaline earth metal materials in a recovery process for recycle to the gas scrubber.

DESCRIPTION OF THE DRAWING

The drawing appended hereto shows, in schematic form, with common valves, fittings, and the like omitted, the wet scrubbing process incorporating the improvement of this invention.

DETAILED DESCRIPTION

The process of this invention particularly relates to the economic disposal of alkaline earth metal sulfates and sulfites produced in slurry form by the reaction of a slurry containing an alkaline earth metal compound, particularly calcium carbonate, with dissolved sulfur oxides scrubbed from stack gases, particularly from electric power plants burning coal or sulfur containing fuel oils. This reaction produces a slurry containing principally the alkaline earth metal sulfate, calcium sulfate if a calcium compound, i.e., calcium oxide, calcium hydroxide or calcium carbonate, is used, but also some of the alkaline earth metal sulfite in a dilute aqueous slurry form, generally about 15 weight percent solids. Much attention has been given to the economic disposal of this material including the reaction of the sulfate and sulfite sludge with carbon, particularly in the form of coal, to recover the sulfur. For example, U.S. Pat. No. 616,391 dated Dec. 20, 1898, describes the reaction using calcium sulfate as the example:

$$CaSO_4 + 2C \rightarrow CaS + 2CO_2 \qquad (1)$$

While the reaction is well-known and the recovery of sulfur and the alkaline earth metal carbonate is relatively simple after the reduction of the sulfate to the sulfide, as described in U.S. Pat. No. 3,574,530, such process requires significant quantities of energy and has become uneconomic due to the rapid increase in such costs. Many inefficiencies and losses occur in the practice of the above reaction through the thermal decomposition of the alkaline earth metal sulfate or sulfite, the amount of thermal energy necessary to dry the material before the reducing step, and the failure to achieve maximum reduction of the sulfite and/or sulfate to the corresponding sulfide. In the practice of this invention, sufficient excess of carbon containing reductant is mixed with the slurry such that once the sulfate/sulfite sludge is reduced, there is enough reducing gas left to prevent the reoxidation of the sulfide by the reaction products and to provide sufficient heating value from the reaction of the reductant, preferably coal, to provide a gas for use in the drying zone to effect substantially total removal of the water from the mixture prior to the reduction reaction. This avoids the adverse influence of carbon dioxide and water vapor in the reduction reaction. Thus, it has been discovered that the reducing compounds, principally carbon, must be present in amounts to provide from about at least about 15%, and preferably 20 to about 40% molar excess above the theoretical amounts necessary to reduce the sulfate and/or sulfite materials present in the reducing zone. Thus, the process of this invention is carried out in a highly reducing atmosphere. In such an atmosphere the following reducing reactions occur in addition to reaction (1), again using calcium as the exemplary alkaline earth metal:

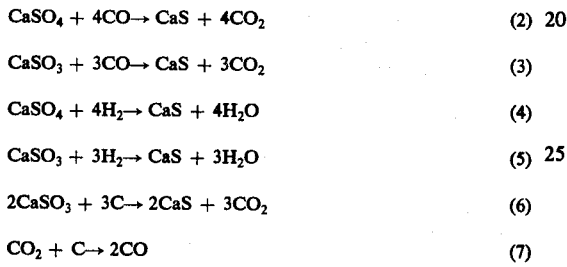

$$CaSO_4 + 4CO \rightarrow CaS + 4CO_2 \quad (2)$$

$$CaSO_3 + 3CO \rightarrow CaS + 3CO_2 \quad (3)$$

$$CaSO_4 + 4H_2 \rightarrow CaS + 4H_2O \quad (4)$$

$$CaSO_3 + 3H_2 \rightarrow CaS + 3H_2O \quad (5)$$

$$2CaSO_3 + 3C \rightarrow 2CaS + 3CO_2 \quad (6)$$

$$CO_2 + C \rightarrow 2CO \quad (7)$$

During the reduction of the slurry most, if not all, of the above reactions occur to some degree. The reduction step may be carried out in any appropriate equipment, preferably a rotary kiln, which is maintained at the temperature of the reducing reaction through the burning of an appropriate fuel such as coal, oil or natural gas. It is only necessary to use sufficient fuel to maintain the temperature of the reduction zone at from about 1600° to about 1800° F., preferably from about 1700° to about 1750° F. Higher temperatures are undesirable since there would be a tendency for the alkaline earth metal sulfate and sulfites to decompose resulting in a loss of the sulfur values which are being recovered, in addition to the waste of energy necessary to maintain higher temperatures. Temperatures lower than about 1600° F. are undesirable since the reaction does not proceed at satisfactory rates at the lower temperatures.

Surprisingly, it has been discovered that in the presence of an oxidizing atmosphere, i.e., excesses of carbon dioxide, that the alkaline earth metal sulfide formed is reoxidized to an alkaline earth metal sulfate. Thus, reaction (2) is a reversible or equilibrium reaction which severely reduces the degree of reduction in the reducing zone unless excesses of carbonaceous reductant, e.g., coal, coke, chars, asphalts, heavy oils, tars, and the like, are present in contact with the sulfate and sulfite.

Thus, when coal is used as the reductant, it has been discovered that when coal comprises from about 15.5 weight percent to about 18 weight percent of the mixture, there is present a sufficient molecular excess of carbon over that necessary to react with the alkaline earth metal sulfites and/or sulfates in the slurry to provide an effluent gas from the reducing step having a heating value of at least about 80 BTU/cf, preferably from about 110 to about 250 BTU/scf. The amount of other reductants to provide equivalent results can be easily calculated by comparison of the reducing potential of coal with the reducing potential of the alternative reductant. This is more thoroughly explained hereinafter.

The reduction reaction is allowed to continue from about 10 to about 200 minutes, preferably from about 15 to about 60 minutes, with about 20 to about 40 minutes especially preferred. The control of residence time within the ranges mentioned is easily determined by the skilled engineer. Of course, such time will vary with the composition of the mixture and the efficiency of the heating apparatus.

It is a particular feature of this invention to use this combustible effluent gas as, at least a substantial portion, if not all, of the fuel for a drying zone to drive off the water present in the slurry, usually from about 30% by weight to about 40% by weight, while still maintaining the temperature of the drying step below the gasification temperature for the reductant used. For the purposes of this description, the gasification temperature is that temperature at which substantial gaseous reaction products evolve from the particular reductant being used.

It is contemplated in the process of this reaction that the drying step be operated at from about 300° to about 600° F., preferably from about 450° to about 550° F. Operating at higher temperatures runs the risk of causing loss to the coal or other reductant present in the mixture, thus removing the reductant prior to the entrance into the reduction zone causing insufficient reductant to be present to completely reduce the sulfate and sulfite in the slurry to the sulfide as well as loss of heating values for the combustible effluent gases. Should lower temperatures be used, the drying time would be abnormally long and thus reduce the efficiency of the process of this invention. Operation of the drying zone and determination of residence time therein can easily be accomplished by the skilled engineer based upon the amount of slurry which must be reacted in the reducing zone and applying the above-described proportions of the coal to the system. From this the amount of water to be removed can be calculated. It has been discovered that effluent gases from the reducing zone having greater than about 80 BTU/scf provide ample heat to the drying zone.

For a more complete description of this invention, discussion will be had with reference to the drawing schematically depicting an entire lime/limestone process for removal of sulfur from stack gases of a power plant, even though the improvement of this invention has application to other scrubbing processes such as the Double Alkali which can be readily determined by those of ordinary skill in the art.

As the sulfur containing fuel is burned in the plant, oxides of sulfur are produced which must exit the plant through the stack gas. In order to protect the environment from the intrusion of these sulfur containing compounds and also to recover the sulfur for other important industrial uses, the stack gases are scrubbed in a wet scrubber by being brought into contact with a spray of a slurry containing an alkaline earth metal compound such as calcium, magnesium, barium or strontium oxides, hydroxides, carbonates or mixtures thereof. While the remainder of the discussion with respect to the gas cleaning process and the recovery of sulfur and the alkaline earth metal compound will pertain to calcium carbonate scrubbing systems for simplicity of discussion, it will be well understood that other species are equally well adapted to the process.

Referring now to the drawing, the stack gases enter the scrubber S through a duct 10 and the calcium carbonate enters the system usually as an aqueous slurry through a pipe 12, manifold 14 and individual spray headers 16a, 16b, 16c and 16d. In the scrubber S the calcium carbonate contacts the sulfur oxides and reacts therewith to form an aqueous slurry of calcium sulfate and calcium sulfite, with the calcium sulfate generally being in the predominance. Sufficient slurry is added to react with substantially all the sulfur oxides present. The sulfur-free stack gases exit the scrubber S through duct 18 and as such can be discharged to the atmosphere. The calcium sulfate and calcium sulfite slurry, or sludge, having a solids content of about 15% exits the scrubber S through line 20 and is transported to an oxidizer O where it is contacted with air brought in through line 22 to oxidize the sulfite to sulfate thus producing a more uniform sulfite/sulfate sludge. The sludge, having 15% solids, exits the oxidizer O through line 24 which conducts it to a thickener T wherein the solids content is increased from about 15% by weight to about 30% by weight through known operation of thickening devices. The thickened slurry exits the thickener T through line 26 which conducts it to a drum or belt filter F for further concentration or removal of water. While a drum filter type concentrator is shown in the drawing, it would be understood by those of ordinary skill in the art that a centrifuge, vacuum filter or other acceptable device for removing water from solids is adaptable to the process of this invention. The important criteria is the removal of water without excessive expenditures of energy to increase the solids content. A solids content of at least about 55%, preferably about 70% by weight, can easily be achieved through such a filtration process. Waste water is removed from the filter F through line 28 and the thickened slurry exits the filter F into a hopper 30 where it is conducted through line 32 to a suitable hopper S2 where the sulfate/sulfite sludge is collected. It is this sludge that is thoroughly and intimately mixed with coal which enters storage hopper S1 through line 34 which becomes the mixture to be treated in the improvement which is the subject matter of this invention.

The reductant, for purposes of this discussion, ground coal, from hopper S1 and the sulfate/sulfite slurry from hopper S2 are fed to the mixer M through conveyers 36 and 38, respectively. It is important in the practice of this invention to obtain thorough mixing between the slurry and coal so that intimate contact is achieved between the sulfate/sulfite to be reduced and the reducing agent, carbon, in the coal. At this point the mixture will become a plastic mass or paste-like material. Any suitable mixer for such materials, such as a screw mixer, paddle mixer, static mixer, or the like is appropriate.

The relative rates of flow of materials through the conveyors 36 and 38 determine the ratios of reactants present in the kiln, or reducing zone, in the practice of this invention. As stated hereinbefore, the proportions are mixed such that the mixture contains from about 15.5 weight percent to about 18 weight percent of coal, depending upon the solids content of the sulfate/sulfite slurry which should be at least about 55% solids by weight and preferably 70% solids by weight. While a higher solids content is satisfactory little efficiency is gained thereby since the expense of achieving such higher solids content or greater degrees of dryness in the other part of the process causes undue expenditure of energy itself. The above proportions of coal to the sulfate and sulfite in the slurry provide a sufficient molecular excess of carbon over that necessary to react with the calcium sulfate and calcium sulfite in the slurry to provide an effluent gas having satisfactory heating value for use as hereinafter described. As a rule of thumb in the practice of this invention, the molecular excess of carbon should be from about 20 to about 40%.

It is preferable to pelletize, or extrude, the mixture prior to the drying step. This has been found to improve the results of the reduction reaction. The equipment for pelletizing or extruding the mixture is not shown on the drawing, but it is to be understood that such treatment of the mixture is well within the scope of this invention and actually preferred. Equipment, such as a balling pan and the like are well-known to the skilled engineers. It is contemplated that pelleting or extrusion could be accomplished almost simultaneously with mixing.

The intimately mixed coal and sulfate/sulfite slurry, now a relatively dry mass, exits the mixer M through line 40 and enters the dryer D which can be either a moving grate dryer, rotary kiln or some other appropriate equipment adaptable for the process. Preferably, the product of the drying step will have a water content of not more than about 2% by weight for maximum realization of the economies of this process. The temperature at which drying is accomplished is maintained below the gasification temperature of the coal, usually from about 300° to about 600° F., preferably maintained between about 450° to about 550° F. The residence time in the dryer is easily calculated by the water content, including water of hydration, of the mixture and the heating value of the gas used as fuel. It is contemplated to be within the scope of this invention that some coal may be burned in addition to the combustible effluent gases for convenience, but such is found not to be necessary when the criteria set out herein are rigidly followed.

The water removed from the mixture in the dryer D and the gases from combustion of the fuel, principally carbon dioxide exit the dryer D through line 42. The carbon dioxide thus exiting the dryer can be used as later described in a combination for converting the calcium sulfide ultimately to calcium carbonate for use in the scrubber S. Air is introduced to the dryer D through line 44 and is used for the combustion of the fuel gases entering the dryer D through line 46.

The fuel gases entering through line 46 are the combustible effluent gases from the reducing reaction as will be hereinafter described. These gases contain heating value of at least 80 BTU's/cf depending upon the ratio of coal added to the slurry in the mixer M. The gases are predominately carbon monoxide and hydrogen diluted by carbon dioxide, some water vapor and some nitrogen entering the kiln with the air for the fuel heating the kiln, hereinafter described. The burning of the effluent gases as fuel in the dryer accomplishes substantially complete use of the coal in the mixture and accomplishes an energy efficient method for recovering the calcium for reuse in the scrubber S and for the sulfur recovery resulting in a useful exploitation of an otherwise troublesome pollutant. Should the amount of coal added to the sulfate/sulfite slurry in the mixer M be less than mentioned above, in addition to inefficient reduction of the sulfate/sulfite slurry in the reducing zone there would be insufficient heating value in the effluent gases to accomplish drying of the mixture. Thus, some additional fuel would be necessary for drying. Some such fuel could be used without departing from the scope of this invention. Large excesses of coal in the mixture will result in satisfactory reduction reactions, however, drier residence time must be reduced to avoid temperature build-up with resultant undesirable coal gasification or ignition in the dryer. Successful reduction of the sulfate/sulfite and recovery of the sulfur would be seriously hampered should ignition occur in the drying zone due to the consequent evolution of sulfur dioxide from the decomposition of calcium sulfite and calcium sulfate.

The heating value of the effluent gases from the reduction can be easily calculated by the consideration of the previously mentioned reactions and applying the guidelines with respect to the mixing of coal. Since the operation of a highly reducing atmosphere results from the above-described mixture, the residual heating values in the combustible effluent gas can be readily calculated and in the practice of this invention, it is found that a heating value of from about 80 to about 200 BTU's/cf are most advantageous. From this heating value and the water contained in the mixture being dried, the skilled engineer can determine the necessary residence time for removal of substantially all the water in the drying zone D.

The dried mixture exits the drying zone D through an appropriate conduit 48 and enters the reduction zone which advantageously can be a rotary kiln K. In the reduction zone which is operated at a temperature of preferably from about 1600° to about 1800° F., but may be as high as about 1900° F. without adverse affects, the coal reacts with the calcium sulfate and calcium sulfite in the sludge in accordance with the previously indicated reactions Nos. 1 and 6 to form calcium sulfide and carbon dioxide. At higher temperatures the sulfate tends to undergo thermal decomposition to the corresponding oxide and sulfur dioxide. Of course, other reactions occur but this is the predominant reaction. Since there is an excess of carbon present, approximately 20 to 40 percent molar excess, the reaction $CO_2 + C \rightarrow 2CO$ would also occur giving rise to a combustible effluent gas having considerable amount of carbon monoxide which has a heating value when burned in air for use in the dryer D to dry the mixture.

The temperature of the reduction kiln K is maintained by burning air and fuel entering through conduit 50 in an amount sufficient to maintain the above-indicated temperature. To avoid creating an oxidizing atmosphere in the kiln K, the fuel, if coal, is burned at from about 5 percent less to about 15 percent more than the theoretical molecular amount of oxygen necessary for complete combustion of coal. Should the fuel be natural gas or oil, then the theoretical deficiency of molecular oxygen can vary from about 5 to about 20 percent. Burning the fuel in this manner contributes to the maintenance of a highly-reducing atmosphere in the reduction zone.

This atmosphere is created by the overall reducing potential of the mixture charge to the kiln K through line 48. This reducing potential is created by the proportions at which the reductant, in this instance coal, is mixed with the sulfate and sulfite in the mixer M. Upon elevation of temperature of the mixture to the range at which the reduction reactions occur, in this process from about 1600° to about 1900° F. and, most preferably, from about 1700° to about 1750° F., the carbon and hydrogen in the coal react as set forth in the previously indicated reactions reducing the sulfate and sulfite to the corresponding sulfide, in our discussion of calcium sulfide. As these reactions occur, the reducing potential of the system is used with the remaining reducing potential being present in the form of carbon monoxide and hydrogen which goes to make up the effluent gas which leaves the reducing kiln K through line 46 and is burned as fuel in the dryer D with air entering through line 44.

The reducing potential which is used in the reducing kiln K can easily be calculated through the following relationships based upon the reactions heretofore set forth assuming that sulfur in the coal is converted to sulfur dioxide.

$$\text{Reducing Potential Used} = \frac{4CaSO_4 + 3CaSO_3}{2C + H_2 - 2(O_2 - S)} \quad (8)$$

The foregoing expression of the reducing potential used in the reducing reaction is derived based upon the empirical conduct of experiments wherein the reducing reaction was carried out in various ratios of mixtures of coal and the sulfate/sulfite slurry. This reducing potential is the basis for making the calculations to determine the equivalent amount of other reductants useful in this invention related to the weight percent of coal added as described hereinbefore.

When the reducing potential, expressed as a fraction (or as a percent), is from about 0.5 to about 0.63 the most efficient systems exist. Should the reducing potential used in the reducing reaction exceed the latter number, it would be found that the most efficient reduction to calcium sulfite would not occur in the reaction and that an undesirable high percentage of the slurry would either remain as the sulfate or sulfite or be reconverted to the sulfate because of serious depletion of the reducing atmosphere. Further, it has been surprisingly discovered that the content of the calcium sulfate in the mixture in the kiln K increases from a minimum value with a prolonged retention time in the reducing zone K. This increase is greatly accelerated when the fraction of the reducing potential used is greater than about 0.63. Therefore, the completeness of the reduction is reduced in a two-fold aspect. Not only is the maximum reduction not achieved, the reverse reaction occurs to a much greater extent causing a significant reduction in the amount of sulfide produced in the reaction zone. Therefore, the aforementioned sufficiency of the excess of carbon introduced into the mixture provides for the maximum reduction of the sulfite and sulfate, prevention of a substantial increase in the reverse oxidation reaction and provides sufficient heating value in the effluent gases to make them useful as a fuel in the drying section D. Thus, not only is the maximum recovery of sulfur effected through the use of this invention, but the maximum utilization of the energy necessary to make such recovery is effected.

After the reduction of the sulfite and sulfate to the corresponding sulfide in the kiln K the material leaves the kiln K through conduit 52 and is immediately quenched in absence of oxygen, either by nitrogen or by water in the quench pot Q. The cooled sulfide thus moves generally as a slurry through conduit 54 from the quench zone Q to a recovery section R which is merely represented by a box diagram, but which represents a solubilization, carbonation and oxidation zone as described in U.S. Pat. No. 3,574,530, for example. Such ultimate recovery is well-known to those of ordinary skill in the art but will be briefly discussed herein for purposes of completeness.

The aqueous slurry of calcium sulfide, which is formed in the quenching zone is then passed to a solubilization zone within the recovery section R. Also introduced to the solubilization zone is a gaseous stream of hydrogen sulfide derived from the carbonation zone of the recovery section R as described below. The flow rate of hydrogen sulfide is sufficient to provide at least 1 mol for each mol of the sulfide. Within the solubilization zone, which generally comprises a stirred reactor, the aqueous slurry is at a temperature of about 150° F. and, as the hydrogen sulfide gas is passed into the slurry, the hydrogen sulfide is consumed by reacting the aqueous medium with the calcium sulfide to form water-soluble calcium hydrosulfide according to the following equation:

$$CaS + H_2S \xrightarrow{(H_2O)} Ca(SH)_2$$

Any calcium sulfate and ash which may be present remains in the solid, undissolved state. The residual gaseous stream containing nitrogen, oxygen and water vapor is vented from the zone.

The aqueous solution of calcium hydrosulfide having unreacted calcium sulfate and ash contaminants suspended therein, is withdrawn from the solubilization zone and passed into a liquid-solids separation zone, such as a filter or centrifuge, where the calcium sulfate-ash mixture is separated from the aqueous solution of calcium hydrosulfide.

The aqueous solution of the calcium hydrosulfide which, now free of solids, is withdrawn from the separation zone and cooled to about 120° F. The solution is then passed to a carbonation zone where it is passed downwardly in countercurrent flow with that portion of the gaseous carbon dioxide-containing effluent evolved from the dryer D through line 42.

The gaseous stream comprising of carbon dioxide is introduced through line 56 to the carbonation zone of the recovery section R. The aqueous solution of calcium hydrosulfide is brought into countercurrent contact with the upwardly flowing carbon dioxide containing gaseous feed and calcium carbonate is formed and, for every mol of carbon dioxide consumed, two moles of hydrogen sulfide are generated in accordance with the reaction of the following equation:

$$Ca(SH)_2 + CO_2 + H_2O \rightarrow CaCO_3 + 2H_2S$$

As the gaseous stream passes upwardly through the aqueous solution which when fed to the carbonation zone is at an elevated temperature, the hydrogen sulfide is stripped from the aqueous medium and is withdrawn in the overhead effluent from the zone. The gaseous effluent is passed to the solubilization zone wherein, as described above, the hydrogen sulfide content is utilized to convert calcium sulfide to water soluble calcium hydrosulfide. The remaining portion of the gaseous effluent from the carbonation zone is passed to an oxidation zone where the hydrogen sulfide is converted to elemental sulfur by the well-known Claus Process.

The aqueous slurry of calcium carbonate produced in the carbonation zone of recovery section R is withdrawn therefrom and concentrated. The concentrated slurry is then recycled to the gas scrubber for further use.

Thus, it is seen that the recovery zone used in the practice of this process provides an extra efficiency in the overall process brought about by the practice of this invention. The sulfur recovered would exit the recovery section R through line 58 and can be used as an important raw material for many reactions to manufacture many products useful at home and in industry. The recovered calcium carbonate would exit the recovery zone in line 60. This calcium carbonate can be recycled as a slurry to the scrubber S for further use in the process.

Thus, it is seen by the above description that the process of this invention is extremely valuable with respect to the overall economics and environmental effect of any operation having sulfur oxides in the stack gases, allowing the use of available needed energy such as coal or fuel oil having some sulfur contained therein. The improvement is valuable since the process can be operated at atmospheric, or near atmospheric conditions.

The invention will be further described by the following specific examples teaching many of the advantages and process parameters of the invention.

EXAMPLE 1

This example demonstrates that the reduction reaction of calcium sulfate and calcium sulfite to the corresponding sulfide is a reversible reaction which must be carried out in a reducing atmosphere in order to maximize the reduction reaction and to prevent the reverse reaction from occurring to a great degree. It further serves as valuable guidance to those of ordinary skill in the art to enable them to determine the residence time to be employed in the practice of the improved process of this invention.

The kiln used in the following runs is an 18 inch diameter, 36 inch long batch kiln heated by natural gas burner located in one of the kiln heads. The other end of the kiln is open and combustion and process gases escape through that opening to be conducted away from the process. The kiln rotates at 3½ rpm and the temperature of the solids and gases is recorded by means of thermocouples inserted in the kiln through its open end. Samples of solids are removed through the open end of the kiln by a sampling device connected to nitrogen cylinder to prevent oxidation of the material. A scrubber sludge from an electric power plant had an analysis on a dry basis of:

| | |
|---|---|
| $CaSO_3 \cdot \frac{1}{2} H_2O$ | 35.69% |
| $CaSO_4 \cdot 2H_2O$ | 12.45 |
| $CaCO_3$ | 14.25 |
| $Fe_2O_3$ | 5.77 |
| $Al_2O_3$ | 8.08 |
| $SiO_2$ | 23.76 |
| | 100.00% |

The total sludge was dryed to 70% solids and mixed with gypsum ($CaSO_4 \cdot 2H_2O$) in order to vary the composition of the test mixtures. Coal was used having the following analysis:

| | |
|---|---|
| Ash | 12.38% |
| S | 3.88 |
| C | 67.79 |
| $H_2$ | 5.77 |
| $N_2$ | 1.53 |
| $O_2$ | 8.65 |
| | 100.00 |
| $H_2O$ | 2.26% |

In these tests the coal, gypsum and sludge were mixed together thoroughly and pelletized. The pellets had varying compositions by weights as shown on Table 1. The pellets were charged to the kiln which was brought up to reaction temperature from its preheat temperature of 800° F. Both the drying step and the reducing reaction occurred in this single vessel. Since, however, the minimum $CaSO_4$ occurred after drying indicates that the drying is independent of the reduction. Samples of the mixture in the kiln were removed and analyzed periodically to determine the calcium sulfate present. It was discovered during the conduct of these runs that the content of the calcium sulfate surprisingly dropped to a very low value when there was a sufficient excess of coal, or reducing material, present and then upon the continuation of the reaction, the calcium sulfate content began to rise to a somewhat higher final value. The determination of these minimum values and the time required to accomplish them is of great value to those of ordinary skill in the art in designing a method to meet specific situations. Runs 6A and 6B are duplicate experiments to demonstrate the reproducability of the data.

While the runs having the lowest use of reducing potential also had the greatest amount of conversion to the sulfide, those runs where the potential was less than 50% used would represent situations where excess heating value is burned in the drying step and less efficient utilization of energy results.

| | |
|---|---|
| -continued | |
| S | 3.88% |
| $N_2$ | 1.53% |
| $O_2$ | 8.65% |
| Ash | 12.38% |
| Dry | 100.00% |
| Moisture | 2% | is thoroughly mixed with the above centrifuge cake and pelletized (about ½ inch diameter) in a rotating pan pelletizer. The mixture is introduced to a grate drying kiln and dried at a temperature of about 500° F. to remove all of the free water and substantially all of the water of crystallization from the calcium sulfate and calcium sulfite. The heat necessary for this drying step is supplied by burning the reaction gases leaving the reduction kiln with a 15% excess air of combustion. These reaction gases have a heat of combustion of about 115 Btu/scf. The dehydrated mixture is then fed from the grate kiln into a rotating kiln wherein the reducing reaction takes place. This kiln is heated with a pulverized coal burner using a theoretical amount of air for combustion to provide a temperature of 1700° F. in the reaction zone. The coal is burned at a rate of about 3,500 pounds per hour and the residence time of the mixture in the kiln is about 45 minutes. The gases from the kiln are conducted to the drying grate kiln where they are burned as aforementioned. The hot reduced mixture is

TABLE 1

| Run No. | 1 | 2 | 3 | 4 | 5 | 6A | 6B | 7 | 8 | 9 |
|---|---|---|---|---|---|---|---|---|---|---|
| Composition % | | | | | | | | | | |
| Gypsum $CaSO_4$ | 54 | 52.5 | 52.5 | 56.4 | 58 | 38 | 38 | 39 | 38.6 | 28 |
| Sludge (70% Dry) | 26 | 22.5 | 25.3 | 27.2 | 29 | 46 | 46 | 47.2 | 46.7 | 56 |
| Coal | 20 | 25 | 22.2 | 16.4 | 13 | 16 | 16 | 13.8 | 14.7 | 16 |
| Reactor Temperature, ° F. | 1750 | 1750 | 1750 | 1750 | 1750 | 1750 | 1750 | 1750 | 1750 | 1750 |
| Time to Reach Temp., Min. | 21.5 | 21.5 | 21.5 | 21 | 23.5 | 28.5 | 34 | 21.5 | 21.5 | 21.5 |
| Length of Run at Temp., Min. | 50 | 50 | 45 | 47 | 40 | 45 | 40 | 52.5 | 50 | 47.5 |
| Time to Reach Lowest $CaSO_4$, Min. | 20 | 30 | 15 | 12 | 20 | 7 | 20 | 21.5 | 30 | 7.5 |
| Natural Gas Burned, SCFM | 1.3 | 1.5 | 1.3 | 1.1 | 1.2 | 1.3 | 1.4 | 1.2 | 1.1 | 1.3 |
| Total Dry Material, Lbs. | 79.5 | 80.9 | 80.0 | 78.7 | 77.8 | 76.2 | 76.2 | 75.7 | 75.9 | 75.0 |
| Total Water, Lbs. | 20.5 | 19.1 | 20.0 | 21.3 | 22.2 | 23.8 | 23.8 | 24.3 | 24.1 | 25.0 |
| $CaSO_4$ + $CaSO_3$ + Coal (Dry), Lbs. | 70.1 | 72.7 | 70.8 | 68.8 | 67.3 | 59.5 | 59.5 | 58.5 | 59.0 | 54.6 |
| Fly Ash + $CaCO_3$ | 9.4 | 8.2 | 9.2 | 9.9 | 10.5 | 16.7 | 16.7 | 17.2 | 16.9 | 20.4 |
| Lowest Analysis $CaSO_4$% | 0.39 | 0.77 | 1.96 | 6.43 | 9.59 | 0.12 | 0.49 | 0.91 | 0.62 | 0.21 |
| Final Analysis $CaSO_4$% | 11.7 | 2.3 | 2.65 | 24.9 | 12.83 | 2.67 | 2.68 | 3.29 | 4.09 | 0.5 |
| Reducing Potential Used% | 53.8 | 41.2 | 47.2 | 69.1 | 89.4 | 57.4 | 57.4 | 68.3 | 63.4 | 50.3 |

ILLUSTRATIVE EMBODIMENT

A wet centrifuge cake having about 70% solids obtained in scrubbing power plant stack gases containing sulfur with a suspension of limestone using the method as described in U.S. Pat. No. 3,883,639 is produced at a rate of about 120,000 pounds per hour having the following composition:

| | Pounds Per Hour |
|---|---|
| $CaSO_4 \cdot 2H_2O$ | 75,820 |
| $CaSO_3 \cdot \frac{1}{2} H_2O$ | 2,127 |
| $CaCO_3$ | 5,049 |
| $SiO_2$ and other inerts | 813 |
| Fly Ash | 651 |
| Total Dry | 84,460 |
| Water | 35,540 |
| Total | 120,000 |

Ground coal flowing at a rate of about 20,400 pounds per hour having the following composition:

| | |
|---|---|
| $H_2$ | 5.77% |
| C | 67.79% | then discharged into an enclosed quench tank for further treatment and recovery of sulfur. The fuel efficiency of the overall process, i.e., the burning of the coal for heat and the coal mixed with the calcium sulfate sludge cake, is approximately 96%.

The system of this embodiment uses approximately 64% of the reducing potential in the reducing zone, thus yielding combustible effluent gases having the above-mentioned heating value available for combustion in the grate kiln.

From the foregoing, those of ordinary skill in the art will readily perceive modifications and changes to the method of this invention which come within the spirit and scope of the claims appended hereto.

I claim as my invention:

1. In a process for reducing an alkaline earth metal sulfate/sulfite slurry to the corresponding sulfide by mixing the slurry with a carbonaceous reductant and heating the mixture to a temperature lower than the decomposition temperature of the alkaline earth metal sulfate/sulfite to cause the reduction reaction to occur, the improvement which comprises:
   a. mixing sufficient reductant with the slurry, containing at least about 55% solids by weight, to provide a molecular excess of carbon of from about 15 to about 40% over that necessary to react with the alkaline earth metal sulfate/sulfite in the slurry to maintain a reducing atmosphere during the reducing step, wherein from from about 50 to about 63% of the reducing potential of the mixture is used in the reaction, and provide a combustible effluent gas from the reducing step having a heating value of at least about 80 BTU per standard cubic foot; and b. burning the combustible effluent gas from the reducing step to dry the mixture at a temperature less than the gasification temperature of the reductant to remove substantially all the water in the mixture prior to the reducing step.

2. The process of claim 1 wherein the carbonaceous reductant is coal.

3. The process of claim 2 wherein the drying takes place at a temperature of from about 300° to about 600° F.

4. The process of claim 3 wherein the water remaining in the mixture after the drying step is not more than about 2% by weight.

5. The process of claim 1 wherein the alkaline earth metal is calcium.

6. The process of claim 1 wherein the reducing step is carried out at a temperature of from about 1600° to about 1900° F.

7. The process of claim 6 wherein the temperature is maintained by burning coal in the presence of from about 5 mol percent less than theoretical oxygen to not more than about 15 mol percent more than theoretical oxygen.

8. The process of claim 6 wherein the temperature is maintained by burning natural gas or oil as the fuel in the presence of from about 10 mol percent to about 20 mol percent less than the theoretical oxygen required for complete combustion of the fuel.

9. A process for removing sulfur oxides from stack gases which comprises the steps of:
   a. scrubbing the stack gas with an aqueous medium to dissolve the sulfur-oxides therein and reacting the dissolved sulfur-oxides with an alkaline earth metal carbonate to produce an aqueous sulfate/sulfite slurry of the alkaline earth metal;
   b. concentrating the resulting slurry to at least about 55% solids by weight;
   c. mixing the concentrated slurry with coal in an amount such that the coal comprises from about 15.5 weight percent to about 18 weight of the mixture;
   d. pelletizing the mixture;
   e. drying the pelletized mixture by burning a combustible effluent gas from a subsequent reducing step to provide a substantial portion of the heat necessary to remove the water in the mixture and provide a combustion product effluent gas;
   f. reacting the alkaline earth metal sulfate/sulfite in the mixture with the coal in a reducing atmosphere, using from about 50 to about 63% of the reducing potential of the mixture, to reduce the sulfate/sulfite compounds to the corresponding sulfide and form the combustible effluent gas burned in step (e);
   g. quenching the sulfide in water to form a slurry;
   h. solubilizing the sulfide in the slurry by reaction with hydrogen sulfide to form the corresponding hydrosulfide;
   i. contacting the hydrosulfide solution with the combustion product effluent gas from step (e) to produce a water slurry of the alkaline earth metal carbonate and hydrogen sulfide gas; and
   j. recycling the alkaline earth metal carbonate to step (a) to react with dissolved sulfur oxides.

10. The process of claim 9 wherein the alkaline earth metal carbonate is calcium carbonate.

11. The method of claim 10 wherein the hydrogen sulfide is oxidized to recover elemental sulfur.

12. The process of claim 1 wherein the temperature during drying is from about 300° to about 600° F and the temperature in the reducing step is from about 1600° to about 1900° F.

13. The process of claim 1 wherein the mixture of slurry and reductant is pelletized prior to drying.

14. The process of claim 1 wherein the carbonaceous reductant is present in a molecular excess of from about 20 to about 40%.

* * * * *